Jan. 5, 1960
S. BECKWITH
2,920,219
DYNAMOELECTRIC MACHINE WITH GAS COOLED
ROTOR AND STATOR CONDUCTORS
Filed Dec. 13, 1952
2 Sheets-Sheet 1
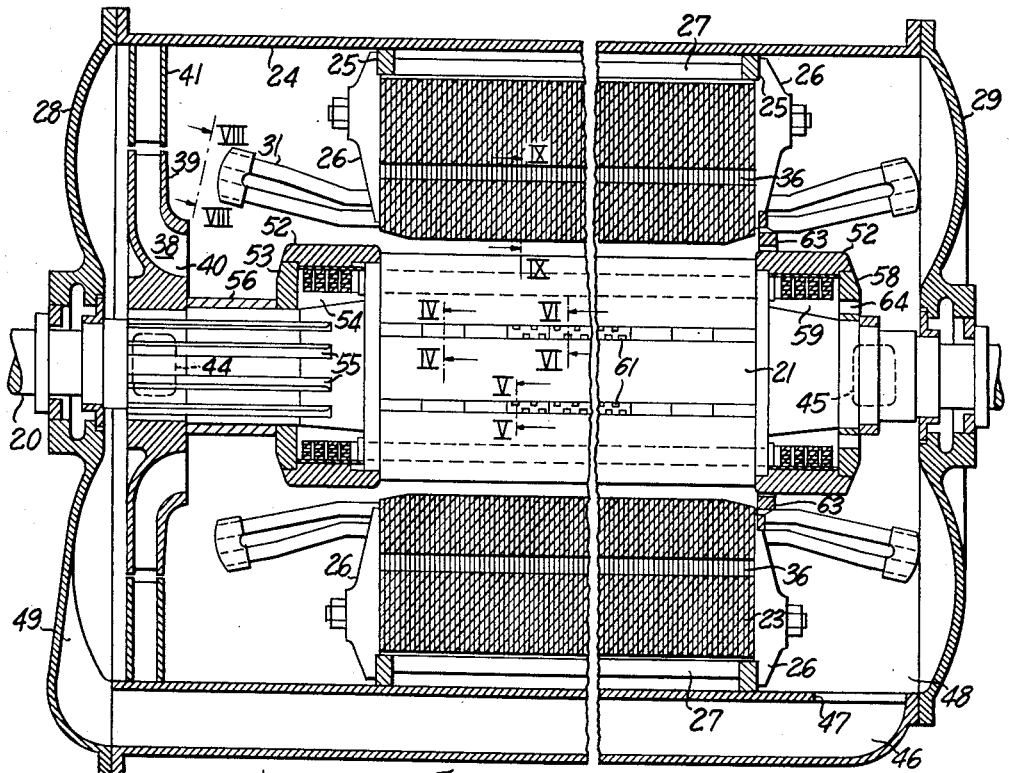
Fig. 3
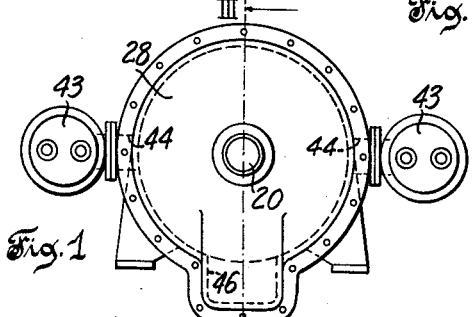
Fig. 1
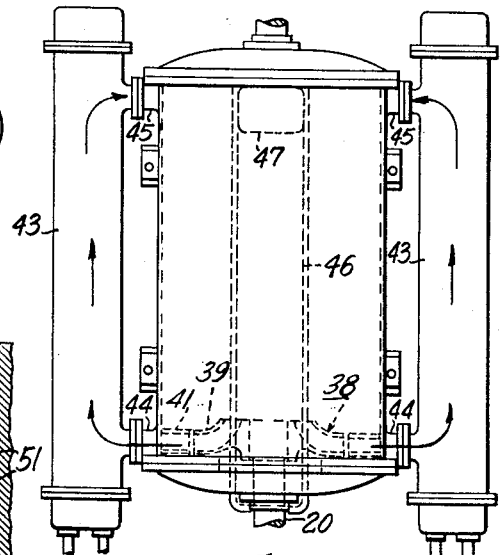
Fig. 2
Fig. 4   Fig. 5   Fig. 6
Inventor
Sterling Beckwith
by T. Lloyd LeFave
Attorney Jan. 5, 1960
S. BECKWITH
2,920,219
DYNAMOELECTRIC MACHINE WITH GAS COOLED ROTOR AND STATOR CONDUCTORS
Filed Dec. 13, 1952
2 Sheets-Sheet 2
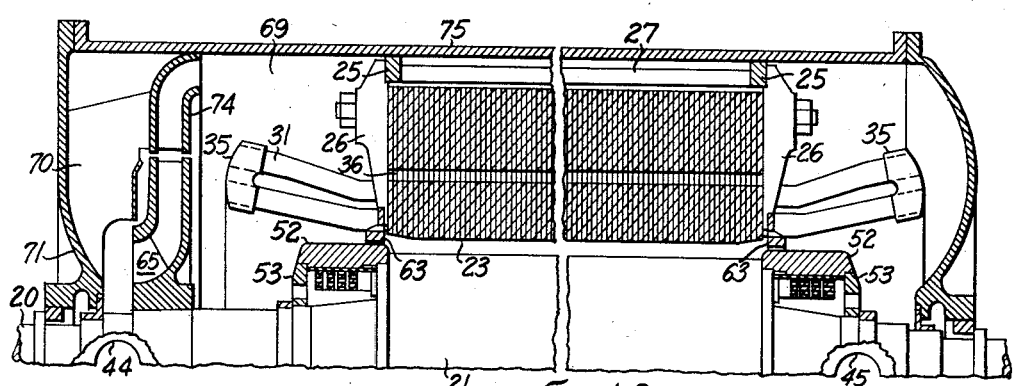
Fig. 12
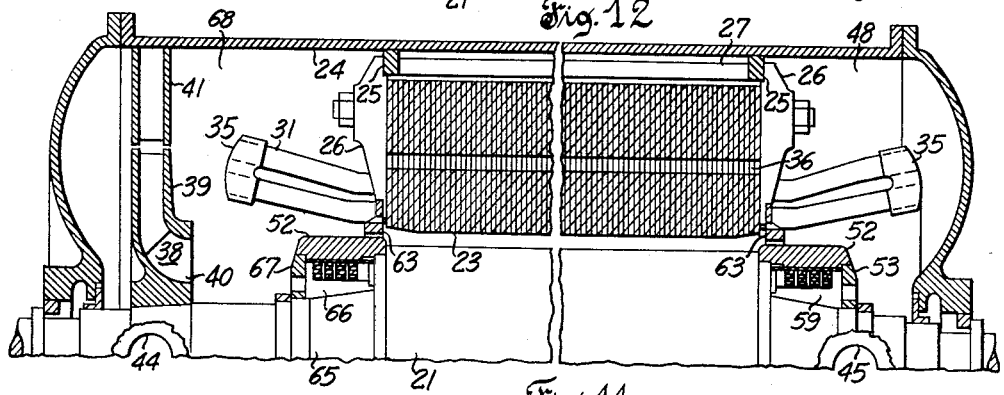
Fig. 11
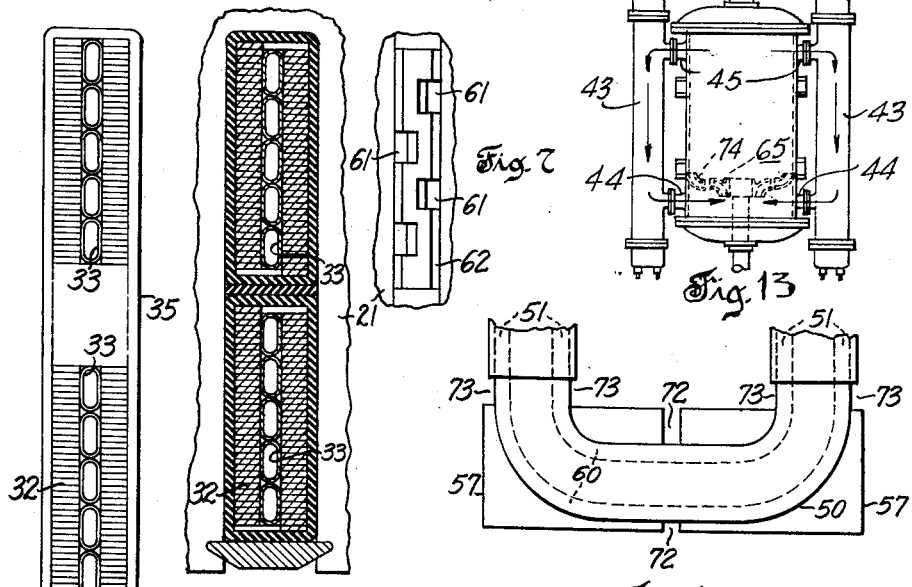
Inventor
Sterling Beckwith
by T. Loyd La Fave
Attorney

United States Patent Office 2,920,219
Patented Jan. 5, 1960

2,920,219

DYNAMOELECTRIC MACHINE WITH GAS COOLED ROTOR AND STATOR CONDUCTORS

Sterling Beckwith, Lake Forest, Ill., assignor to Allis-Chalmers Manufacturing Company, Milwaukee, Wis.

Application December 13, 1952, Serial No. 325,846

4 Claims. (Cl. 310—55)

This invention, which is a continuation-in-part of application Serial No. 243,255, filed August 23, 1951, relates to the construction and ventilation of dynamoelectric machines, particularly to improved ventilating arrangements for large high speed machines such as turbogenerators which are preferably hydrogen cooled.

The present invention employs new and improved ventilating arrangements to increase the cooling of a dynamoelectric machine such as a hydrogen cooled turbogenerator so that either the power rating of the machine may be increased, or for a given rating the size of the machine may be substantially reduced.

Heretofore, hydrogen cooled dynamoelectric machines such as turbogenerators had fans which, when operated in hydrogen of normal purity, developed maximum differential pressures of the order of two and one-half inches of water and circulated hydrogen through the machine at rates above about eighty cubic feet per minute per kilowatt absorbed by the hydrogen to keep the temperature rise of the conductors below a certain maximum.

According to the present invention a gas cooled dynamoelectric machine such as a hydrogen cooled turbogenerator is cooled by a new and improved ventilating arrangement in which hydrogen is caused to flow in ducts provided in the conductor slots of the rotor and of the stator, whereby it is brought into direct contact or into substantially direct contact with the conductors. The axial ducts which bring the hydrogen in direct contact with the conductors are necessarily of small transverse cross sectional area and of great length. These ducts therefore have considerable resistance to the flow of hydrogen. Fans heretofore used to circulate hydrogen in dynamoelectric machines could not force sufficient hydrogen through such axial ducts to keep the temperature rise of the hydrogen below an essential maximum, and the rating of the turbogenerator having such ducts therefore could not be increased by the use of such fans. Rotor cooling with hydrogen in direct contact with the conductors results in the rotor copper cross section being reduced to provide gas passages in the copper and therefore results in an increase in the rotor copper losses. Regardless of the duct size chosen, therefore, the copper temperature will exceed a maximum desirable hot spot temperature and the hydrogen temperature will exceed the essential maximum if the fan circulating the hydrogen develops only the maximum differential pressure heretofore developed in such machines.

This maximum below which it is essential that the temperature rise of the gas in the axial ducts in the rotor and in the stator be kept is the American Institute of Electrical Engineers' standard hot spot maximum of ninety-five degrees centigrade rise less the temperature difference between the copper and the cooling gas. The maximum gas rise would thus be seventy-five degrees centigrade if the gas to copper drop were twenty degrees centigrade. Thus, in order that all parts of the conductor copper be cooled below the maximum hot spot temperature and the gas rise not exceed the essential maximum, a certain minimum flow of hydrogen in the conductor ducts is critical. This critical flow is twenty-five cubic feet per minute per kilowatt of heat absorbed by the hydrogen when the fan inlet is at atmospheric pressure.

When the gas flow reaches at least twenty-five cubic feet per minute per kilowatt of heat produced in the core conductors, a threshold is passed and permissible rotor heat production can be increased roughly in proportion to the gas flow. For a gas flow below the threshold value, however, the gas temperature rise, at a point where gas discharges from the core, would be so high that acceptable hot spot temperatures would be exceeded.

In order to obtain the necessary flow of ventilating gas through a dynamoelectric machine, such as the hydrogen cooled turbogenerator embodying the present invention, very high differential gas pressures are necessary. With air as the ventilating gas, the differential pressure necessary is at least eight times that normally developed heretofore. With hydrogen as the ventilating gas the differential pressure necessary is increased from the maximum previously developed differential pressure of the order of two and one-half inches of water to a differential pressure of at least eight inches of water. Thus, the capacity of this machine can be increased by operating above the threshold value of twenty-five cubic feet per minute of ventilating gas passing through passages in substantially direct contact with the metal of the conductors instead of the previous normal minimum value of eighty cubic feet per minute of ventilating gas through ducts distinct from the conductor passages of the machine. For absolute pressures above one atmosphere, a supercharged hydrogen cooled machine having a differential fan pressure of at least eight inches of water has a greater decrease in rotor temperature for an equal increase in hydrogen pressure than known hydrogen cooled machines with heretofore maximum differential fan pressures on the order of two and one-half inches of water.

If the velocity of the ventilating gas which is in substantially direct contact with the copper of the conductors produces laminar flow, the conductors are not adequately cooled and the machine power rating is less than that of a conventionally cooled dynamoelectric machine of the same size. In supercharged cooling, as described herein, the velocity of the ventilating gas along the slot portions of the conductors always produces nonlaminar or turbulent flow which, as is well known, is more effective in absorbing heat from the conductors by preventing the formation of an insulating layer of still gas on the surface of the conductors.

It is therefore an object of the invention to provide an improved cooling arrangement for the conductors of a dynamoelectric machine with the ventilating gas in direct contact with the conductors.

Another object of the invention is to provide improved cooling means for the conductors of a dynamoelectric machine which shall be easily constructed and economically manufactured.

Another object of the invention is to increase the output capacity of a turbogenerator with given physical dimensions particularly to permit building of larger generators than would otherwise be possible.

Another object of the invention is to decrease the physical dimensions and weight of a turbogenerator with a given output capacity.

Another object of the invention is to provide an improved ventilating arrangement for a dynamoelectric machine which substantially eliminates differential expansion between a core conductor and the core iron.

Another object of the invention is to provide an improved totally enclosed gas cooled dynamoelectric machine whose power rating may be proportionately increased by more than the proportionate increase in the average gas pressure within the machine housing.

Other objects and advantages will be apparent to one skilled in the art from the following description taken with the accompanying drawings, in which the different figures are drawn on different scales. In the drawings:

Fig. 1 is an end view of a dynamoelectric machine embodying the present invention;

Fig. 2 is a plan view of the dynamoelectric machine shown in Fig. 1 and in Fig. 11;

Fig. 3 is a partial cross sectional view of the dynamoelectric machine taken along the line III—III of Fig. 1;

Figs. 4, 5 and 6 are cross sectional views of conductors secured by slot wedges in a slotted rotor core of the dynamoelectric machine taken along lines IV—IV, V—V and VI—VI, respectively, of Fig. 3;

Fig. 7 is a plan view of a rotor slot wedge employed in the central portion of the rotor of the dynamoelectric machine shown in Fig. 3;

Fig. 8 is an end view of an end turn portion of the stator winding of the dynamoelectric machine taken along the line VIII—VIII of Fig. 3;

Fig. 9 is a view in transverse cross section of a slot portion of the stator winding of the dynamoelectric machine taken along the line IX—IX of Fig. 3;

Fig. 10 is a plan view of the end turns of one pole of the rotor conductors of the dynamoelectric machine shown in Fig. 1;

Fig. 11 is a partial view in sectional elevation of another gas cooled dynamoelectric machine embodying the present invention;

Fig. 12 is a partial view in sectional elevation of a further gas cooled dynamoelectric machine embodying the present invention; and Fig. 13 is a plan view of the dynamoelectric machine shown in Fig. 12.

Referring to the drawing, the totally enclosed dynamoelectric machine such as the turbogenerator shown in Figs. 1 to 3 comprises a rotating field member or rotor mounted on or integral with a rotatable shaft 20 supported in suitable bearings, not shown. The rotor comprises a slotted magnetic core 21 provided with a field winding. The bearings support the rotor core 21 in coaxial relation with a stator with an air gap therebetween.

The stator comprises a slotted laminated core 23 mounted in a stationary support. The stationary support comprises a cylindrical frame 24. Radial annular support plates 25 are secured to the inner periphery of the frame to support longitudinally extending bars 27 on which the stator core laminations are assembled. Clamping members 26 hold the laminations together in their assembled position.

End bells 28, 29 are secured to the ends of frame 24 and their central portions are provided with suitable shaft seals. The end bells and the casing form a totally enclosed housing for the machine which is normally fillable with a light density gas such as hydrogen. The gas may have an average pressure equal to atmospheric pressure, but may have an average pressure of any suitable value, such as thirty pounds per square inch above atmosphere.

Axially extending armature winding 31 may comprise any suitable ventilated conductors in which the ventilating gas has direct contact or substantially direct contact with the metal of the conductors but preferably comprises the stranded conductors shown in Figs. 8 and 9. These conductors comprise copper or aluminum strands 32 stacked in two rows on opposite sides of the slot. To reduce eddy currents in the conductors, the strands are preferably coated with insulating material and transposed within the slot. The two stacks of strands are spaced by a plurality of high resistivity tubes 33 which extend in a row longitudinally of the conductors. These high resistance tubes 33 are preferably of Monel metal, which has a resistivity thirty-eight times that of copper, so that the depth of the tubes may be made more than the depth of several conductor strands without producing undue eddy current losses in the tubes. The end connection joining two conductors extending in different slots comprises a copper clip 35 which envelops the spaced end portions of the two conductors. The strands and the tubes of the conductors and the clip are brazed together whereby the tubes form part of the conductors. The ends of the tubes 33 extend as in a window of the clip 35 so that ventilating gas can enter the tube openings and pass through the tubes in good heat conducting relation to the strands of the conductors from one end of the machine to the other.

The stator core 23 is also provided with axial ventilating ducts through the laminated core comprising aligned holes in the laminations forming ducts 36 which open to the ends of the core between clamping fingers 26 and adjacent to core slots containing stator windings. These ducts 36 are relatively small in transverse cross section so they pass only a limited proportion of the stator ventilating gas between the ends of the machine. The sizes of stator ducts 36 and of the ducts formed by tubes 33 are relatively proportioned so that the relative amounts of ventilating gas passed therethrough maintain the stator core and the stator conductors at substantially the same temperature when the machine is operated near rated load thereby substantially eliminating differential expansion between the conductors and the iron of the stator core.

Because of the high differential gas pressures employed in this machine, the axial ducts 36 extending through the stator core laminations permit effective cooling of the core iron without the use of radial passages, even on the longest machines, and thus permit use of substantially more core iron in a given core length.

Ventilating gas is circulated through the machine by blower means comprising a single high pressure blower 38 shown mounted on the shaft 20 at one end of the machine between end bell 28 and the rotor and stator cores. The blower 38 may be a multiple stage centrifugal blower but is preferably a single stage blower having the single impeller 39 whose diameter is greater than the diameter of the inner periphery of the stator core. The inlet 40 to the impeller 39 is located centrally thereof along the shaft and on the side adjacent the cores. Radially aligned with impeller 39 is annular diffuser 41 mounted on the inner periphery of casing 24.

Heat in the circulated ventilating gas is absorbed by one or more coolers 43 which may be disposed within the housing but as shown are disposed longitudinally of the machine and outside of the machine housing. Opposite end portions of each cooler are connected through ports in the housing by suitable ducts 44, 45. Duct 44 opens in the diffuser region of the blower to receive ventilating gas therefrom, and duct 45 opens into the region 48 adjacent end bell 29 to supply cool ventilating gas under relatively high pressure to the axial ventilating passages in the stator and rotor cores. A longitudinal duct 46, which is made gas tight, is integral with casing 24 and is connected by a port 47 in casing 24 to the high pressure gas region 48 adjacent end bell 29. The other end of duct 46 opens to another high pressure gas region 49 between end bell 29 and the blower 38 to supply ventilating gas to the blower end of the rotor ducts.

For the most effective rotor ventilation the rotor windings are constructed and arranged in the slots of the rotor core 21 to provide ventilating ducts 51 bringing the ventilating gas into direct contact with the metal of the winding conductors 50. The conductors of the axially extending rotor windings have their end turns held in place at the blower end of the core by a retaining ring 52 and an end plate 53 which together with the shaft 20 and the adjacent end of the rotor core define an enclosed space 54 for receiving supercharged ventilating gas. Duct means which connect enclosed space 54 with the pressure chamber 49 comprise axial ducts in the shaft formed by flutes 55 in the shaft. The mounting for blower 38 cooperates with a cylinder 56 to enclose the flutes 55 so the ducts formed thereby open only into pressure chamber 49 and into space 54 enclosing rotor end turns.

At the other end of the shaft 20, the rotor end turns are also secured by a retaining ring 52 and an end plate 58. End plate 58 has apertures 64 therein to permit ventilating gas to flow from pressure region 48 into the space 59 defined by end plate 58, a retaining ring, the rotor core and the shaft.

The arrangement of the rotor conductors 50 within the rotor slots is clearly shown in Figs. 4 to 6. The conductors are disposed in superposed insulated relation within rectangular or trapezoidal slots. Each conductor has a substantially trapezoidal cross section. The adjacent conductors in each slot are reversed so that adjacent conductors of a pair cooperate with the insulated walls of the slot to define therebetween the smooth surfaced axial ventilating ducts 51 on opposite sides of the slot extending the length of the rotor core. These ducts are open at the ends of the slots to the enclosed spaces 54, 59.

Radial ventilating passages 61 connect the axial ventilating ducts 51 with the air gap of the machine. The radial passages are located intermediate the ends of the slot portions of the rotor conductors and may be spaced throughout the length of the core or concentrated at the central portion thereof as shown in Fig. 3. The radial passages 61 extend through the side portions of the conductors and the side portions of slot wedges 62 and these passages are staggered on opposite sides of the slots.

In the operation of the turbogenerator at normal speed of rotation, the supercharger or blower 38 develops a pressure differential of at least eight inches of water when hydrogen at atmospheric pressure is the ventilating gas. The blower is a suction type blower which forces ventilating gas into coolers 43 and pressure chambers 48, 49. From pressure chamber 48, which is on the opposite end of the stator and rotor cores, the blower draws the ventilating gas in parallel paths and at high velocity through the axial ducts 36 in the stator laminations, through the axial ducts formed by tubes 33 in the armature winding, and through the air gap from one end of the machine to the other where the gas returns to the inlet of the blower. The blower also draws ventilating gas from pressure chamber 48 into enclosed space 59 and from pressure chamber 49 via flutes 55 into enclosed space 54. From these enclosed spaces 54, 59, the blower causes the ventilating gas to enter both ends of the rotor into the ducts 51 in the conductors, to flow at high velocity therethrough and to discharge through radial passages 61 into the air gap for return to the blower.

For the design of rotor conductor shown in Figs. 4 to 6, the ventilating gas is free to enter into the ducts 51 which open into the enclosed spaces 54, 59 under the retaining rings. These coil ends or end turn portions of the rotor windings may be left substantially bare. For discharge of the ventilating gas from the center of the rotor, these coil ends preferably are suitably blocked as shown in Fig. 10, by means comprising blocks 57 disposed along the end turn portion of the rotor conductors partially covering the rotor conductors to define therewith end ventilating ducts 60 and gas inlet ports 72, 73 for admitting a relatively small flow of the ventilating gas which enters the ducts 51 to enter in the ports 72 of end ducts 60 at the axial extremity of the end turns and a relatively large flow of such ventilating gas to enter the ports 73 where the conductors enter the core. This results in the gas in the end turn portions of the conductors having a considerable rise in temperature while cooling the end turns satisfactorily. The warm gas from the end turn portion of each conductor mixes with the cool ventilating gas which enters the ducts where the conductor enters the core. The resulting gas mixture at the inlet to the rotor core has a temperature a few degrees warmer than the temperature of the gas in space 54. The ducts in the end turn portion of the rotor conductors have a substantial resistance to the flow therethrough of the ventilating gas. By thus bypassing some of the ventilating gas past the coil ends and admitting it at the core ends the volume of ventilating gas through ducts 51 is substantially greater than it would be if all the ventilating gas flowed through the end ducts and therefore the temperature rise of the gas in the ducts 51 from inlet to discharge points is less than it would be if all the gas entered at the coil ends. The ventilating gas flows axially through the tubes 33 in the stator and through the ducts 51 in the rotor conductors at a very high velocity to produce a turbulent flow of the ventilating gas resulting in a high rate of heat transfer between the conductors and the gas.

To restrict the flow of ventilating gas through the air gap from one end of the machine to the other, annular member 63, which may be made of any suitable material such as laminated synthetic resin, is suitably mounted on the end of the stator core remote from the blower with the inner periphery of the annular member close to the surface of the adjacent rotor retaining ring.

The rate of flow of the ventilating gas through the stator and rotor ducts with the ventilating gas substantially in direct contact with the conductors is at least tweny-five cubic feet per minute per kilowatt of heat to be removed so that the temperature rise of the ventilating gas does not exceed substantially seventy-five degrees centigrade. When hydrogen is the ventilating gas measured at atmospheric pressure, the blower must supply the hydrogen at a differential pressure of at least eight inches of water between the supply and discharge points of the rotor and stator ducts. Differential pressure actually developed by blower 38 is in excess of eight inches of water and thus increases the rate of gas flow above the minimum of twenty-five cubic feet per minute per kilowatt of heat absorbed and proportionately increases the heat absorption capacity of the machine. Although the power rating of any machine may be increased by an increase in the average gas pressure within the machine, such increase is greater with supercharged cooling. If the average gas pressure within the machine is above one atmosphere absolute, the blower must supply a mass flow of hydrogen at least equal to that obtained with a hydrogen pressure of one atmosphere and at a fan pressure of at least eight inches of water.

Fig. 11 shows a turbogenerator like that shown in Fig. 3 with the coolers 43 disposed outside of the main housing and the blower 38 forcing ventilating gas first through the coolers and then through the stator and rotor ventilating passages. The rotor, however, has a winding comprising conductors, as shown in Fig. 4, having axial ventilating ducts 51 for the passage of ventilating gas therethrough from one end of the machine to the other. There are no radial ducts in the rotor and therefore no discharge of ventilating gas from the center of the rotor. Gas from pressure chamber 48 flows through apertures in plate 53 into space 59 and enters the ducts 51 in the rotor conductors and after passing axially therethrough the gas enters space 66. Space 66 is defined by shaft 65, a retaining ring 52, an end plate 67, and the end of the rotor core nearest the blower. Plate 67 is apertured to permit the ventilating gas discharged from the coil ends in space 66 to pass therethrough into space 68 adjacent the inlet to blower 38.

An annular member 63 may be secured to the stator adjacent the rotor retaining ring at either end or at both ends of the core to control the flow of ventilating gas through the air gap.

Thus blower 38 forces ventilating gas through ducts 44 directly into coolers 43 where the heat generated by the action of the blower is removed as well as the heat absorbed by the gas from the stator and rotor. From the coolers, the cooled ventilating gas flows through ducts 45 into a chamber 48 at the end of the machine away from the blower. From chamber 48 the ventilating gas is drawn by the blower at relatively high velocities through the axial ducts in the rotor and stator.

Fig. 12 shows a turbogenerator like that shown in Fig. 11 but comprising a compressor type blower 65 instead of a suction type blower. The blower 65 forces ventilating gas into a diffuser 74 which discharges the gas under relatively high pressure into the chamber or space 69 between the blower and the stator and rotor. From pressure chamber 69, the ventilating gas flows in parallel paths from one end of the machine to the other end of the machine through the axial ducts 36 in the stator core, through the ducts defined by the tubes 33 in the armature winding, through the air gap, and through the ducts 51 in the rotor winding. The flow of gas through the air gap is restricted by at least one annular member 63 secured to the stator adjacent a rotor retaining ring. After discharging from the stator and rotor cores and from the air gap, the ventilating gas flows through ports in the casing connected to ducts 45 into coolers 43, and from the coolers through ducts 44 connected to ports in the casing 75 to the space 70 between end bell 71 and blower 65 adjacent the inlet to the blower for recirculation through the machine.

While but a few embodiments of the present invention have been shown and described, further embodiments or combinations of those described herein will be apparent to one skilled in the art without departing from the spirit of the invention or the scope of the appended claims.

It is claimed and desired to secure by Letters Patent:

1. A totally enclosed gas cooled dynamoelectric machine comprising a stator having a laminated core provided with axially extending slots containing conductors constructed and arranged to provide axial ducts therethrough, a rotatable shaft, a rotor mounted on said shaft and comprising a core provided with axially extending slots containing conductors constructed and arranged to provide axial ducts and radial ventilating passages, a cooler, a high pressure blower, said blower compressing said gas to a relatively high pressure of at least eight inches of water multiplied by the ratio of the density of the gas in the machine to the density of hydrogen at atmospheric pressure to cause said gas to flow in a path through said cooler and said ventilating ducts of both said cores at a rate of at least twenty-five cubic feet per minute per kilowatt of heat absorbed, and means restricting the size of said air gap at one end of said machine to limit the flow of ventilating gas into said air gap, the ventilating gas discharged from said rotor into said air gap flowing axially through said air gap to said other end of said machine and back to said blower.

2. A totally enclosed gas cooled dynamoelectric machine having a laminated core provided with axially extending slots containing conductors, said stator core having a plurality of axial ducts in the laminations extending from one end of the machine to the other, a tube disposed in good heat conductive relation with said strands, said tube having a resistivity several times the resistivity of said strands and defining an axial ventilation duct extending from one end of the stator to the other, the relative cross sections of said stator ducts in said laminations and said stator ducts defined by said tubes being proportioned to cause said laminations and said strands to have the same temperature at rated stator current to substantially eliminate differential expansion between the stator conductors and the stator core.

3. A totally enclosed gas cooled dynamoelectric machine comprising a stator having a laminated core provided with axially extending slots containing windings, a rotatable shaft, a rotor mounted on said shaft, said rotor including a core provided with axially extending slots containing windings, said stator core and said rotor core defining an air gap therebetween, said stator windings and said rotor windings comprising conductors constructed and arranged in said core slots to provide axial ducts therewith bringing the gas into substantially direct contact with the slot portions of the stator and rotor conductors, a cooler, a blower, said blower compressing said gas to a relatively high pressure of at least eight inches of water multiplied by the ratio of the density of the gas in the machine to the density of hydrogen at atmospheric pressure to cause said gas to flow in a path through said cooler and said ventilating ducts of both said cores at a rate of at least twenty-five cubic feet per minute per kilowatt of heat absorbed, and means restricting the size of the air gap at one end of the machine to limit the flow of ventilating gas into said air gap at said one end to cause the flow of said gas in said ducts to be substantially unaffected by the passage of gas into said air gap from said one end of said machine.

4. In a dynamoelectric machine having a stator and a cylindrical rotor, an annular air gap extending a part of the axial length of said rotor, axially extending ducts on said rotor for cooling winding conductors thereon, pressure head producing means near said rotor adjacent one end of said air gap tending to drive a cooling gas in an axial direction through said air gap in multiple with said ducts, and means to impede the passage of said driven gas in said axial direction through said air gap while allowing free passage of said gas into said ducts.

References Cited in the file of this patent

UNITED STATES PATENTS

| | | |
|---|---|---|
| 1,170,192 | Rudenberg | Feb. 1, 1916 |
| 1,499,695 | Rudenberg | July 1, 1924 |
| 2,185,728 | Fechheimer | Jan. 2, 1940 |
| 2,460,752 | Jacobson | Feb. 1, 1949 |
| 2,573,670 | Moses | Oct. 30, 1951 |
| 2,605,312 | Boyer | July 29, 1952 |

FOREIGN PATENTS

| | | |
|---|---|---|
| 172,839 | Switzerland | Feb. 1, 1935 |
| 218,903 | Germany | Feb. 11, 1910 |
| 539,722 | Germany | Dec. 1, 1931 |
| 714,319 | France | Sept. 1, 1931 |
| 724,413 | France | Jan. 29, 1932 |